United States Patent [19]

Parthasarathy et al.

[11] 4,168,483
[45] Sep. 18, 1979

[54] SYSTEM FOR DETECTING SUBSTRUCTURE MICROFRACTURES AND METHOD THEREFOR

[75] Inventors: Shakkottai P. Parthasarathy, Burbank; Keshavaiyengar Y. Narasimhan, Huntington Beach, both of Calif.

[73] Assignee: The United States of America as represented by the Administrator of the National Aeronautics & Space Administration, Washington, D.C.

[21] Appl. No.: 830,562

[22] Filed: Sep. 6, 1977

[51] Int. Cl.² .............................................. G01V 1/40
[52] U.S. Cl. ..................................... 367/26; 181/102; 181/105; 367/28
[58] Field of Search .................. 340/15.5 A, 15.5 AC, 340/15.5 AP, 15.5 CF, 15.5 F, 15.5 GC; 181/102, 104, 105

[56] References Cited

U.S. PATENT DOCUMENTS

| | | | |
|---|---|---|---|
| 3,292,143 | 12/1966 | Russell | 340/15.5 CF |
| 3,332,512 | 7/1967 | Sundt | 340/15.5 CF |
| 3,406,776 | 10/1968 | Henry | 340/15.5 A |
| 3,447,126 | 5/1969 | Reid | 340/15.5 GC |
| 3,524,162 | 8/1970 | Zill | 340/15.5 AC |
| 3,636,463 | 1/1972 | Ongkiebong | 340/15.5 GC |
| 3,731,268 | 5/1973 | Landrum, Jr. | 340/15.5 CF |
| 3,781,785 | 12/1973 | Balch | 340/15.5 DS |
| 3,909,775 | 9/1975 | Lavigne | 340/15.5 BH |
| 3,924,260 | 12/1975 | Braham et al. | 340/15.5 GC |

*Primary Examiner*—Howard A. Birmiel
*Attorney, Agent, or Firm*—Monte F. Mott; John R. Manning; Paul F. McCaul

[57] ABSTRACT

Bursts of signals at different frequencies are induced into substructure, adjacent a borehole. The return signals from each burst of signals are normalized to compensate for the attenuation, experienced by more distant return signals. The peak amplitudes of return signals, above a selected level, are cut off, and an average signal is produced from the normalized amplitude-limited return signals of each burst. The averaged signals of the return signals of all the signal bursts at the different frequencies are processed, to provide a combined signal, whose amplitude is related to the microfracture density of the substructure adjacent the borehole.

5 Claims, 5 Drawing Figures

SYSTEM FOR DETECTING SUBSTRUCTURE MICROFRACTURES AND METHOD THEREFOR

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention is generally directed to determining substructure permeability and, more particularly, to a system for and method of determining the permeability of substructure near a borehole by backscatter logging from microfractures.

2. Description of the Prior Art

Extractability of oil is significantly dependent on the permeability of the substructure to fluid flow. One characteristic of the formation which contributes to permeability is porosity. This characteristic and its suitability for oil extraction purposes presently can be assessed by a number of techniques, which include radioactivity, resistivity and acoustic velocity logging. In addition, much information is obtained by a detailed study of core samples, which have been removed during drilling of the borehole. However, porosity alone does not uniquely indicate the total permeability of the formation surrounding the borehole.

In low porosity formations, fractures may provide local short range drainage for the matrix and effective flow paths to the borehole. Even relatively small fractures can increase the total permeability greatly, without contributing much to the porosity of the formation. One way of assessing the contribution of large and small (micro) fractures to permeability is by examination of core samples, obtained in the hole-boring operation. However, such evaluations do not necessarily define adequately the permeability of the matrix, immediately surrounding the borehole, and are practically useless for indicating the permeability of the matrix, some distance away from the borehole. The ere drilling of the borehole may change the local stress patterns and thus alter or even hide fractures, already present in the core sample, or even introduce new ones. In addition, some fractures of interest may not intersect the core sample and hence cannot be found in the examination. Finally, core sampling is quite expensive.

Other methods of assessing permeability are used, such as flow testing the well. However, this technique is also expensive and time consuming as well, and therefore not attractive. Sonic and ultrasonic reflection detection techniques are also used. The borehole televiewer log is useful for "seeing" wall discontinuities, formation dip and fractures. Pulses of ultrasound are beamed to the walls of the borehole and received as reflections, as the tool rotates and simultaneously descends into the borehole at slow speed. An intensity-modulated display of the inner surface of the borehole is obtained, but this tool has little value for "seeing" fractures some distance away from the borehole into the formation.

Another tool that is used is the acoustic amplitude log which is a sonic reflection type of tool, similar to the velocity logging tool. Sound pulses are generated, which travel from the source to the receiver, located a few feet below, with the waves taking various paths in the borehole mud and through the adjoining formations. The intensity-modulated display of the amplitude of the received signal vs the time of travel indicates presence of large fractures as regions of low signal. To that extent, this tool is useful for making some assessment of permeability.

There is a need for better techniques and means for evaluating tight fracture patterns, at least several feet out into the formations surrounding the borehole and to assess their contribution to overall permeability of the matrix.

OBJECTS AND SUMMARY OF THE INVENTION

It is a primary object of the present invention to provide a system for indicating the permeability of substructure near a borehole.

Another object is to provide a system for providing an indication of the density of microfractures in the substructure adjacent a borehole, without destructively affecting the substructure.

A further object is to provide a method of obtaining data from a substructure near a borehole, to derive information about the substructure permeability by determining the microfracture density of the substructure.

These and other objects of the invention are achieved by sequentially transmitting signals at different frequencies, for different periods through the borehole wall into the adjacent substructure and receiving returned echoes or signals. These return signals are then processed, including adjustments of signal amplitudes to account for return signal attenuation due to travel distance, to produce an output, indicative of the substructure permeability based on the microfracture density of the substructure.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
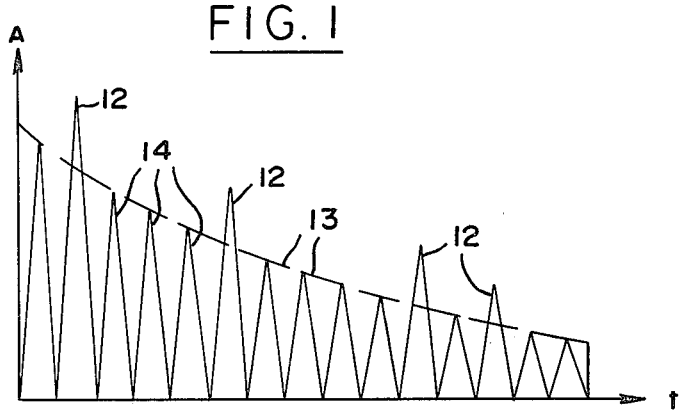
FIG. 1 is a waveform diagram useful in explaining the type of return signals received by the present invention.

Attention is first directed to FIG. 1. It represents the type of return signals or simply returns to a receiver of insonification of the substructure by causing acoustic signals from a source to propagate into it. The returns are reflected back to the receiver by fractures, including small fractures (microfractures) in the substructure. Over discrete intervals of time, insonification produces what appears to be decaying amplitude (A) signals perceived by the receiver. The peak signals 12, extending above the broken line 13 are representative reflections or returns from large fractures or other solid objects (such as boulders), encountered by the search signal, emitted by the source. The much lower amplitude signals 14, generally referred to as grass signals, below the broken line, represent reflections from microfractures. The broken line 13 is the imaginary upper limit of the maximum amplitude of the grass signals which are the items of interest of the present invention. The slope of this line 13 with time actually indicates the attenuation experienced by the returns from microfractures more distant from the borehole over the longer paths.

Usability of grass signals is limited by the signals distinguishable over the system noise level. The value of the noise level can be readily determined, by reading the system output without search signal excitation. Subtraction of the average value of the noise signal from the total average value then indicates the true value of the reflections obtained with search signal excitation, and this is an indicator of the contribution of microfractures to the permeability of the matrix to fluid flow.

Figures 2, 5:
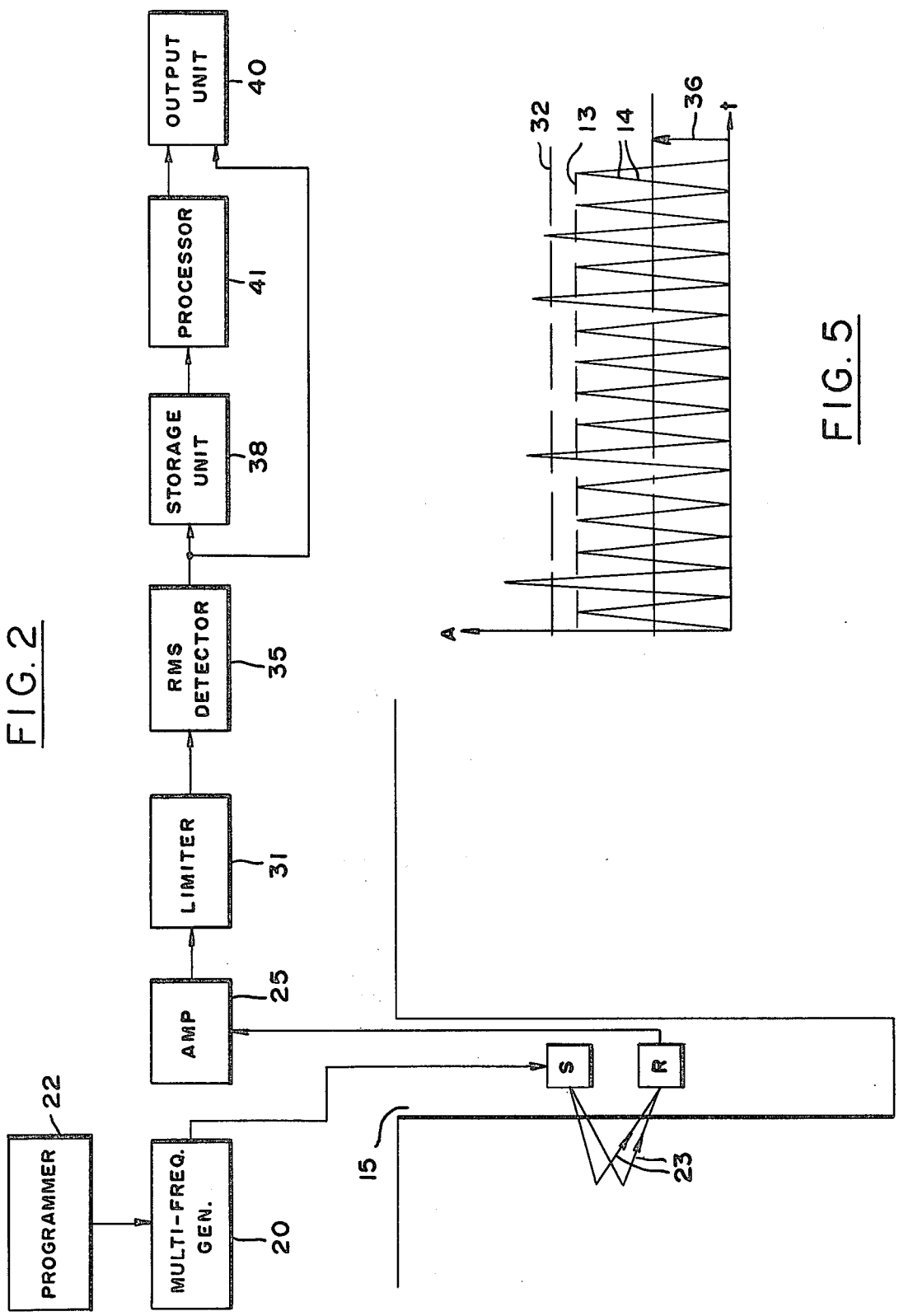
FIG. 2 is a combination block and cross-sectional diagram in connection with which the invention will be described.

Attention is now directed to FIG. 2 which is one embodiment of a system in accordance wth the present invention. Therein numeral 15 designates a borehole. The invention is directed to determining the permeability of the substructure around borehole 15 by analyzing returns from small fractures in the substructure. As shown, for explanatory purposes a single signal source (S) and a single receiver (R) are located in the borehole 15. The source S is fed by a multifrequency generator 20, whose operation is controlled by a programmer 22. The latter controls the generator 20 to feed source S with a sequence of bursts of signals. Both the length of each burst and the frequency of the signals in each burst are controlled by programmer 22. Each burst is followed by an interval of silence during which the source is inactive. During each interval of silence the returns are received by the receiver R and are fed to an amplifier 25.

Figure 3:
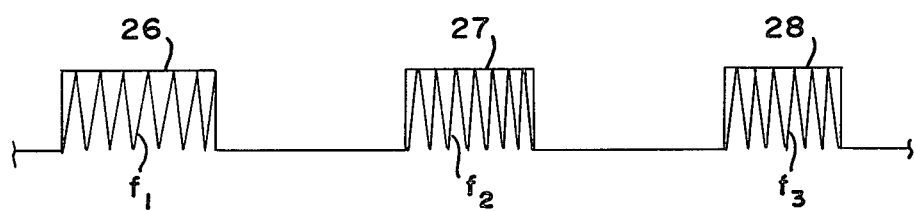
FIGS. 3-5 are additional waveform diagrams used to explain the various features of the invention.
Figure 4:
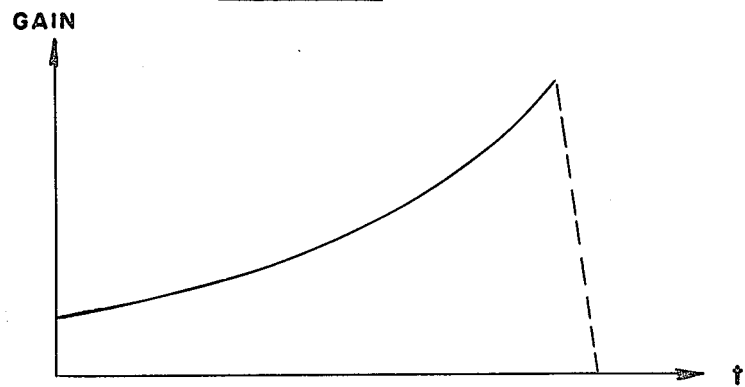

FIG. 3 is a single waveform diagram of the type of bursts provided by generator 20, under the control of programmer 22. The three diagrammed bursts are designated by 26, 27 and 28. During each burst, signals at a different frequency are fed to the source S. For explanatory purposes, the frequencies are designated by $f_1$, $f_2$ and $f_3$. The returns, received by receiver R, are processed in the amplifier 25 which is assumed to have a flat frequency response over the frequency range of interest, but whose gain (G) increases with time, as shown in FIG. 4. This increased gain with time normalizes the attenuation experienced by more distant returns to receiver R, as shown in FIG. 1.

The output of the amplifier 25, due to the increased gain with time characteristic, is as shown in FIG. 5. This output is supplied to a limiter 31 which cuts off the peaks of the large signals 12 at a level 32 somewhat above the highest expected amplitude 13 of the grass signals, so that only the grass signals are utilized. The cut-off level 32, provided by limiter 31, may be made adjustable for different local conditions.

The normalized signals from each burst, i.e., the output of limiter 31, is fed to a detector 35, e.g., a root mean square (RMS) detector, which produces an average signal of an average amplitude designated in FIG. 5 by 36. This signal represents the returns from microfractures at a particular frequency of one of the bursts. The signal for each burst is then processed to provide a resultant average signal for all the search frequencies, which is related to the density of the microfractures along the particular line of search, into which the signals from source S were transmitted and from which returns were received by receiver R.

The amplitude of each signal for each different burst from detector 35 may be stored in a signal storage unit 38, or displayed or printed out, separately, by output unit 40. Also, if desired, the stored signals in unit 38 for all the different bursts of signals of different frequencies may be combined by processor 41 whose output may then be supplied to output unit 40. In any of these possibilities, the output signals from detector 35 for the different frequencies are indicative of the density of microfractures and, therefore, are related to substructure permeability in the volume from which the returns were reflected back to receiver R.

With the present invention microfracture density of up to several meters, e.g., 10 meters, from the borehole may be detected without in any way destructively affecting the substructure. The contemplated frequencies, though not limited, may vary from 1 or more KHz, e.g., 10 KHz, up to 1 MHz. It is appreciated that the distance of the substructure from the borehole from which data can be derived decreases with frequency. However, if the substructure is quite dense, microfracture density of at least 1 or more meters from the borehole can be determined with signals at 1 MHz. The duration of each burst may be varied. Generally it may be on the order of $10\lambda$, where $\lambda$ is signal wavelength.

As previously pointed out, in FIG. 2, the single source S and the single receiver R are shown for explanatory purposes only. In practice several sources and or receivers may be positioned sequentially at different levels in the borehole or in different azimuthal orientations at each level to obtain returns from different directions. Also, if desired, the source(s) and receiver(s) may be combined and packaged in one instrument unit. Furthermore, the source(s) and receiver(s) may be coupled to the borehole wall for improved coupling to the substructure rather than be suspended in it, as shown in FIG. 1 for explanatory purposes only. In addition, once data is obtained at one borehole depth the source(s) and receiver(s) may be positioned sequentially at different levels in the boreholes to obtain information of the substructure near the borehole along a desired depth range.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. A system for deriving data indicative of microfracture density in substructure, adjacent a borehole, comprising:
   first means for inducing bursts of signals into the substructure adjacent said borehole;
   second means for receiving return signals from the substructure in response to each burst of signals induced therein; and
   amplifying means for processing the return signals from each burst;
   said amplifying means having a gain that increases with time in an amount that is substantially inversely proportional to the decrease in reflected signal intensity with time due to the progressively greater distance from which the received signals have been reflected; and limiting means coupled to said amplifying means, for passing only signals below a predetermined amplitude representing reflections from microfractures of predetermined size, while limiting signals above that amplitude, whereby to minimize the effect on output of reflections from boulders and other objects in the substructure.

2. The system described in claim 1 including:

root mean square detector means coupled to the output of said limiting means, for generating a signal representing the root mean square average intensity of the detector means output.

3. The system described in claim 2 wherein:

said first means generates a plurality of bursts of signals, with different bursts having different frequencies; and including an output circuit coupled to said root mean square detector means, for generating an output signal representing the average of the outputs of said detector means resulting from bursts of a plurality of different frequencies.

4. The system described in claim 1 wherein:

the frequency of at least some of said bursts exceed 10 KHZ, whereby to provide high reflections from microfractures.

5. In a method of obtaining information about the microfracture density of substructure adjacent a borehole, the steps comprising:

applying acoustic signals into the substructure;

detecting signals returned by the substructure toward said borehole;

amplifying said detected signals with a gain that increases with time in an amount that substantially compensates for the attenuation in reflected signal strength due to the progressively greater distance from which the reflections occur with increasing delay from the time of applying the acoustic signals;

limiting the amplitude of the amplified signals, to pass only signals below a preselected level representing reflections from microfractures of predetermined size; and generating an average signal representing the average amplitude of amplified signals below said preselected level.

* * * * *